United States Patent [19]
Fuks

[11] 3,954,863
[45] *May 4, 1976

[54] SYNTHESIS, POLYMERIZATION AND QUATERNIZATION OF N-SUBSTITUTED ACRYLAMIDINES
[75] Inventor: Robert Fuks, Brussels, Belgium
[73] Assignee: Union Carbide Corporation, New York, N.Y.
[ * ] Notice: The portion of the term of this patent subsequent to Apr. 22, 1992, has been disclaimed.
[22] Filed: May 8, 1973
[21] Appl. No.: 358,357

[52] U.S. Cl. .................... 260/564 R; 260/79.3 R; 260/465 R; 260/465.1; 260/465.9
[51] Int. Cl.² ................................ C07C 123/00
[58] Field of Search ......... 260/564 R, 465 R, 465.1, 260/465.9

[56] References Cited
UNITED STATES PATENTS
3,598,800   8/1971   Gätzi .......................... 260/564 R OTHER PUBLICATIONS
Gordon et al., J. Org. Chem., Vol. 24, pp. 269–271, (1959).
Chemical Abstr., Vol. 70, Column 18, 873(s), (1969).
Chemical Abstr., Vol. 47, Column 3818(g), 3819(c), (1953).

Primary Examiner—Gerald A. Schwartz
Attorney, Agent, or Firm—Israel Blum

[57] ABSTRACT

N-substituted acrylamidines, a new class of acrylic monomers, are synthesized by the process of this invention which comprises successively contacting with an acrylonitrile or derivative thereof (a) a Lewis acid catalyst, (b) an alkyl halide and (c) an amine. Novel polyacrylamidines as well as quaternary salts of polyacrylamidines are disclosed. Due to their basic nature the N-substituted acrylamidines are useful for introducing basic groups into polymers.

16 Claims, No Drawings

SYNTHESIS, POLYMERIZATION AND QUATERNIZATION OF N-SUBSTITUTED ACRYLAMIDINES

This invention relates to novel N-substituted acrylamidines as well as a novel process for their synthesis. Furthermore, this invention relates to novel polyacrylamidines and quaternary salts of polyacrylamidines.

Heretofore, only the unsubstituted acrylamidine has been described in the literature, e.g., M. Lora Tamayo and J. Royo Martinez, 48B *Anals real soc. espan. frs. y quim* 81 (1952); 47 *Chem. Abstr.* 3819 C (1953), K. Yagishita et al., *J. Antibiotics* 21, 444 (1968). No reactions describing the synthesis of N-substituted acrylamidines have been disclosed. Furthermore, polyacrylamidines have not been disclosed nor have quaternary salts of polyamidines/polyacrylamidines been disclosed previously. Only polyamidines have been described in the literature, e.g., U.S. Pat. No. 3,049,499, 57 *Chem. Abstr.* 13988 e (1962); U.S. Pat. No. 3,450,646, 71 *Chem. Abstr.* 61894 g (1969).

It has recently been discovered that a wide variety of N-substituted acrylamidines can be conveniently synthesized by successively contacting with acrylonitrile or a derivative thereof (a) a Lewis acid catalyst (b) an alkyl halide and (c) an amine. Novel N-substituted polyacrylamidines and novel quaternary salts of N-substituted polyamidines/polyacrylamidines can also be prepared conveniently.

Accordingly, one or more of the following objects will be achieved by the practice of this invention. It is an object of this invention to provide a novel composition of matter for the whole class of N-substituted acrylamidines. A further object of this invention is to provide a process for the synthesis of the aforementioned novel compositions. Another object is to provide novel N-substituted polyacrylamidines and novel quaternary salts of N-substituted polyamidines/polyacrylamidines. A further object of the invention is to provide N-substituted acrylamidines and derivatives thereof which are useful in a wide variety of applications. A still further object is to provide certain novel N-substituted acrylamidines and derivatives thereof. These and other objects will readily become apparent to those skilled in the art in the light of the teachings herein set forth.

The four steps of the process of this invention can be illustrated by the following four reactions:

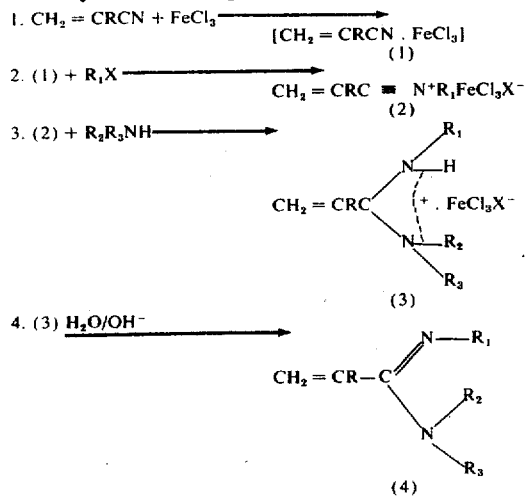

The first step of the novel process comprises contacting a Lewis acid catalyst with an acrylonitrile compound. In reaction one, the formula $CH_2 = CRCN$, represents an acrylonitrile compound. R represents a hydrocarbyl group preferably containing up to 18 carbon atoms, but, more preferably contains up to 12 carbon atoms and most preferably contains up to 6 carbon atoms. Particularly preferred acrylonitriles which can be employed in the process of this invention are those where the R group represented includes a hydrogen atom, alkyl, alkenyl, aryl, alkaryl, aralkyl, cycloalkyl, cycloalkenyl, bicycloalkyl and the like.

Illustrative acrylonitrile compound which can be employed in the process of this invention include, among others, acrylonitrile, methacrylonitrile, butacrylonitrile, propacrylonitrile, hexacrylonitrile, pentacrylonitrile, 2,3-xylacrylonitrile, m-toluacrylonitrile, p-anisacrylonitrile and the like.

Illustrative Lewis acid catalysts which can be employed in the process of this invention include, among others, ferric chloride, boron trifluoride, stannic chloride, and the like.

In the second step of the process of this invention, formula (1) represents the reaction product produced in the first step of this novel process and $R_1X$ represents an alkyl halide. $R_1$ represents an alkyl group preferably containing up to 18 carbon atoms and more preferably up to 12 carbon atoms and most preferably up to 6 carbon atoms.

Preferred alkyl halides which can be employed in the process of this invention include those wherein $R_1$ represents t-butyl, isopropyl, n-hexyl, n-pentyl and the like, and X represents halides such as chloride, bromide and the like. Particularly preferred alkyl halides are those wherein the alkyl group is a branched-chain saturated hydrocarbon group containing up to 18 carbon atoms and more preferably containing up to 12 carbon atoms and most preferably containing up to 6 carbon atoms.

In the third step of the process of this invention, formula (2) represents the reaction product of step two of the process of this invention. The $R_2$ and $R_3$ groups in the amines employed in this step preferably each contain up to 18 carbon atoms, more preferably contain up to 12 carbon atoms and most preferably contain up to 6 carbon atoms. Particularly preferred amines which can be employed in the process of this invention include those where the $R_2$ and $R_3$ groups represented each include an alkyl, alkenyl, aryl, alkaryl, aralkyl, cycloalkyl, cycloalkenyl, bicycloalkyl, haloalkyl, haloaryl, haloalkaryl, hydroxyalkyl, hydroxyaryl groups and the like. In addition, $R_2$ and $R_3$, taken together, may be part of a heterocyclic ring, e.g., as in piperidine and the like.

Illustrative amines which can be employed in the process of this invention include, among others, ammonia, aniline, methylamine, diethylamine, m-toluidine, 2,3-xylidine, p-anisidine and the like.

In the fourth step of the process of this invention, formula (3) represents the reaction product of step three of the process of this invention and formula (4) represents the structural formula for the N-substituted acrylamidines produced by the process of this invention wherein R, $R_1$, $R_2$ and $R_3$ have the same values as previously indicated.

The first three steps of the reaction can be conducted in the presence of a solvent which is inert to the reactants and which is easily separated from the product. Suitable solvents which can be employed are the normally liquid, inert organic solvents, such as, the halogenated hydrocarbons, heterocyclic compositions, and the like. Illustrative solvents include among others, benzene, carbon tetrachloride, methylene chloride, chlorobenzene, cyclohexane and the like. The fourth step of the process of this invention can be conducted in the presence of water or a suitable base solution such as a solution containing sodium hydroxide, potassium hydroxide or the like.

The reaction can be conducted at a temperature of about 0°C. but this temperature is not necessarily critical. Temperature ranges from about 0° to about 50°C. would likewise effect the reaction. Pressure is not necessarily critical and the reaction process can be effected under atmospheric, subatmospheric or superatmospheric conditions.

Formation of the N-substituted acrylamidines in good yield generally takes a few hours up to several days depending on the particular temperature, solvent and reactants.

The proportion in which the reactants are utilized can vary broadly, and does not limit the invention. Typically, equimolar proportions of the reactants are employed. Higher or lower proportions of the reactants can also be employed satisfactorily. However, the efficient utilization of the reactants will generally decrease when greater than stoichiometric, i.e., equimolar proportions are employed.

Upon completion of the reaction, the N-substituted acrylamidine product can be recovered in any convenient matter. For example, the product can be recovered as the residue obtained upon the evaporation or distillation of any unreacted material and/or solvent present.

In one embodiment of the present invention, N-substituted polyacrylamidines are prepared by polymerization of the acrylamidine product (4) obtained in step 4 of the process of this invention. Since the details of polymerization do not form a part of this invention and are part of the prior art, it is not described herein.

The acrylamidine of this invention can be polymerized alone to form a homopolymer, or copolymerized with other acrylamidines or other polymerizable monomers. For example, polymers can be prepared by the polymerization of minor amounts of an acrylamidine of this invention and major amounts of other polymerizable monomers. Illustrative of such monomers are, e.g., ethylene, propylene, 1-butylene, 1,4-butadiene, isoprene, 2-chloro-1,4-butadiene, styrene, alpha-chlorostyrene, 4-chlorostyrene, alpha-methylstyrene, 2-methylidene-5-norbornene, 2-ethylidene-5-norbornene, 1,4-divinylbenzene, acrylic acid, methacrylic acid, acrylamide, methacrylamide methylacrylate, ethyl acrylate, n-propyl acrylate, n-butyl acrylate, iso-butyl acrylate, n-hexyl acrylate, methyl methacrylate, ethyl methacrylate, N-methylacrylamide, N-methylmethacrylamide, N,N-dimethylacrylamide, N,N-diethylacrylamide, N-ethylmethacrylamide, N,N-diethylmethacrylamide, N-methylolacrylamide, 2-hydroxy-ethylacrylamide, maleic anhydride, maleic acid, fumaric acid, dimethyl maleate, diethyl maleate, dimethyl fumarate, diethyl fumarate, maleimide, N-ethylmaleimide, maleamide, maleamic acid, N,N'-diethylmaleamide, N,N'-diethylfumaramide, vinyl formate, vinyl acetate, vinyl propionate, vinyl butyrate, vinyl methyl ether, vinyl ethyl ether, acrylonitrile, methacrylonitrile, and the like. A catalyst such as peroxide or persulfate and the like may be used to initiate polymerization.

The polymers prepared by the process of this invention are selected from the group characterized by the following recurring units and consisting of:

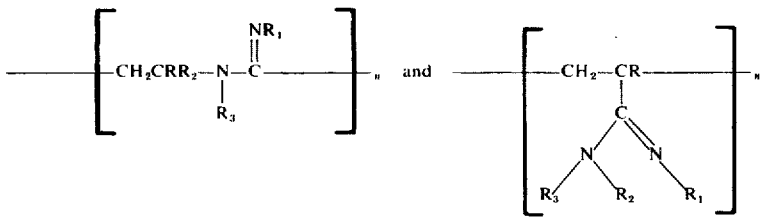

wherein $R$, $R_1$, $R_2$ and $R_3$ have the same values as previously indicated.

Illustrative novel polymerized N-substituted acrylamidines encompassed by this invention include, among others, N-phenyl-N'-i-propylacrylamidine; N-phenyl-N-methyl-N'-i-propylacrylamidine; N,N,N'-tri-i-propylacrylamidine; N,N'-di-i-propylacrylamidine, N,N,N'-triphenyl-acrylamidine; N-phenyl-N'-i-propylmethacrylamidine; N,N'-di-i-propylmethylacrylamidine; N-phenyl-N'-i-propylpentacrylamidine, N-phenyl, N'-i-propylethacrylamidine and the like.

In another embodiment of this invention, polyquaternary salts can be prepared by contacting with dimethyl sulfate either the monomers, structure (4), obtained in step 4 of the process of this invention or the N-substituted polyacrylamidines, obtained by polymerization of the N-substituted acrylamidine product, structure (4). The N-substituted polyacrylamidine sulfate compound can then be recovered in any conventional manner, i.e., using temperature, pressure, stoichiometric conditions and the like and evaporation, distillation, techniques and the like to recover the polyquaternary salts.

When the monomer represented by structure (4), obtained in step 4 of the process of this invention is contacted with dimethyl sulfate, an N-substituted polyacrylamidine sulfate compound is obtained, i.e., a polyacrylamidium salt. These salts are useful as new water-soluble polyelectrolytes of the quaternary ammonium type.

The compositions of this invention are particularly useful for the introduction of basic groups into polymeric networks. For example, the acrylamidines of this invention are useful in the production of resins for the paper making industry. Resins which are "substantive to cellulose" are generally employed in the manufacture of paper and are used to collect fine particles. The compositions are also useful when introduced by copolymerization into ion-exchange resins. The basic nature renders the resin useful as coagulating agents for example coagulation and recovery of coal from water solutions.

The following examples are illustrative of the invention:

EXAMPLES 1–4

The following experimental procedure was used in these four typical runs: 6.6 ml. (0.1 mols) of acrylonitrile was added to 16.2 g (0.1 mols) of $FeCl_3$ in 100 ml. of isopropyl chloride cooled with an ice bath. The mixture was stirred under nitrogen for 1.25 hours. Excess isopropyl chloride was evaporated under vacuum. The residue, as represented by structure (2) in the second step of the process of this invention, was taken up in 50 ml. of methylene chloride and the mixture cooled at −10°C. Amine (0.1 mols) in 10 ml. of methylene chloride was added dropwise with stirring. After this addition, the mixture was maintained for 1 hour at ± 10°C. Then the methylene chloride solvent was evaporated to dryness and 0.42 mols of NaOH in a 30% solution was added to the residue under cooling with an ice bath. After the mass was extracted with light petroleum ether or ether and the extract dried, evaporation gave the crude N-substituted acrylamidine, represented by structure (4) in the fourth step of the process of this invention. The crude N-substituted acrylamidine was purified by distillation under high vacuum.

The N-substituted acrylamidine compounds set forth in Table A were synthesized in the manner described in the above experimental procedure. Table A sets forth the particular $R_1$, $R_2$ and $R_3$ groups employed in each example, the resulting yields and the melting or boiling points for each composition. Additionally, Table A sets forth the formulae for the particular N-substituted acrylamidine synthesized in each example and the results of elemental analysis for each composition. It should be noted that in the four examples acrylonitrile was used, but other acrylonitrile compounds can be substituted freely.

for 24 hours. The resulting polymer was then taken up in 10 ml. of methylene chloride and precipitated by adding the solution to 10 ml. of pentane. Then, the resulting solid precipitate was filtered and dried giving 0.58 g. of a white powder, which represented a yield of 60%. Thermogravimetrical analysis (T.G.A.) of the white powder solid indicated it was stable up to 300°C. Elemental analysis gave these results:

Calculated for $C_{12}H_{16}N_2$: C: 76.55; H: 8.57; N: 14.88. Found: C: 76.32; H: 8.74; N: 14.70.

EXAMPLE 3

Preparation of N-methyl-N-phenyl-N′-i-propylpolyacrylamidine sulfate

Polyquaternary salts can be prepared by treating polyacrylamidines with dimethyl sulfate.

For example, 0.477 ml. of dimethyl sulfate was added to 10 ml. of a benzene solution containing 0.94 g. of N-phenyl-N′-i-propylpolyacrylamidine. The benezene was then evaporated and the residue was triturated with ether until it solidifies. The residue was then filtered and the solid was dried. Thermogravimetrical analysis of the solid indicated it had a decomposition point which starts at 180°C.

Although the invention has been illustrated by the preceding examples, the invention is not to be construed as limited to the materials or conditions employed herein, but rather the invention encompasses the generic area as hereinbefore disclosed. Various modifications and embodiments of this invention can be made without departing from the spirit and scope thereof.

What is claimed is:

1. A process for the synthesis of N-substituted acrylamidine compounds of the formula:

| Example | $R_1$ | $R_2$ | $R_3$ | B.P. or M.P. | Yield | Formula | Calculated | | Found | |
|---|---|---|---|---|---|---|---|---|---|---|
| 1 | i-propyl | H | i-propyl | 25–20°/0.1 Torr. | 40–50% | $C_9H_{18}N_2$ | MW: | 154 | C: | 69.77 |
| | | | | | | | C: | 70.80 | H: | 11.78 |
| | | | | | | | H: | 11.76 | N: | 18.37 |
| | | | | | | | N: | 18.16 | | |
| 2 | i-propyl | i-propyl | i-propyl | 28–30°/0.1 Torr. | 56% | $C_{12}H_{24}N_2$ | MW: | 196 | C: | 73.13 |
| | | | | | | | C: | 73.41 | H: | 12.09 |
| | | | | | | | H: | 12.32 | N: | 14.53 |
| | | | | | | | N: | 14.27 | | |
| 3 | i-propyl | H | phenyl | 37–41° | 37% | $C_{12}H_{16}N_2$ | MW: | 188 | C: | 76.12 |
| | | | | | | | C: | 76.55 | H: | 8.77 |
| | | | | | | | H: | 8.57 | N: | 14.76 |
| | | | | | | | N: | 14.88 | | |
| 4 | i-propyl | $CH_3$ | phenyl | 66–70°/0.1 Torr. | 33% | $C_{13}H_{18}N_2$ | MW: | 203 | C: | 76.80 |
| | | | | | | | C: | 77.18 | H: | 9.18 |
| | | | | | | | H: | 8.97 | N: | 13.94 |
| | | | | | | | N: | 13.85 | | |

EXAMPLE 2

Preparation of N-phenyl-N′-i-propylpolyacrylamidine

Classical methods can be used to polymerize the acrylamidine compounds, represented by the structure (4) in the fourth step of the process of this invention. The resulting product is novel polyacrylamidines.

For example, to create the novel N-phenyl-N′-i-propylpolyacrylamidine, 0.96 g of N-phenyl-N′-i-propylacrylamidine was heated in a vessel sealed under nitrogen with 9.6 mg. of azobisisobutyronitrile at 75°C.

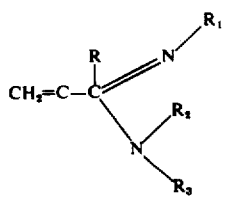

which process comprises the steps of:
a. contacting an acrylonitrile compound of the formula:

with a Lewis acid catalyst to form a first reaction compound of said acrylonitrile and said Lewis acid catalyst, and b. contacting an alkyl halide of the formula:

R₁X with said first reaction compound to form a second reaction compound, and c. contacting an amine of the formula:

R₂R₃NH with said second reaction compound to form a third reaction compound, and d. contacting said third reaction compound with a basic solution to form a mixture and
e. separating N-substituted acrylamidine compounds from said mixture, wherein in each of the above steps R represents hydrogen or a hydrocarbyl group containing up to 12 carbon atoms and is a member selected from the group consisting of hydrogen, alkyl, alkenyl, aryl, alkaryl, aralkyl, cycloalkyl, cycloalkenyl and bicycloalkenyl; R₁ represents an alkyl group containing up to 12 carbon atoms; R₂ and R₃ represent groups each containing up to 12 carbon atoms and each are members selected from the group consisting of alkyl, alkenyl, aryl, alkaryl, aralkyl, cycloalkyl, cycloalkenyl, bicycloalkyl, haloalkyl, haloaryl, haloalkaryl, hydroxyalkyl and hydroxyalkaryl.

2. A process as defined in claim 1 wherein steps (a), (b), and (c) are conducted in the presence of a liquid inert organic solvent.

3. A process as defined in claim 1 wherein the reaction is conducted within the temperature range of about 0°C. to about 50°C.

4. A process as defined in claim 3 wherein the reaction is conducted at a temperature of about 0°C.

5. A process as defined in claim 1 wherein said Lewis acid catalyst is ferric chloride.

6. A process as defined in claim 1 wherein said alkyl halide is isopropyl chloride.

7. A process as defined in claim 1 wherein said acrylonitrile compound is acrylonitrile.

8. A process as defined in claim 1 wherein said acrylonitrile compound is methacrylonitrile.

9. A process as defined in claim 1 where said amine is ammonia.

10. N-substituted acrylamidine compounds represented by the formula:

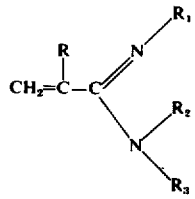

wherein R represents hydrogen or a hydrocarbyl group containing up to 12 carbon atoms and is a member selected from the group consisting of hydrogen, alkyl, alkenyl, aryl, alkaryl aralkyl, cycloalkyl, cycloalkenyl and bicycloalkenyl; R₁ represents an alkyl group containing up to 12 carbon atoms; R₂ and R₃ represent groups each containing up to 12 carbon atoms and each are members selected from the group consisting of alkyl, alkenyl, aryl, alkaryl, aralkyl, cycloalkyl, cycloalkenyl, bicycloalkyl, haloalkyl, haloaryl, hydroxyalkyl and hydroxyalkaryl.

11. The N-substituted arcylamidine compounds as defined in claim 10 wherein R represents a hydrogen atom.

12. The N-substituted arcylamidine compounds as defined in claim 10 wherein R represents a methyl group.

13. A N-substituted acrylamidine compound as defined in claim 11 wherein R₁, R₂ and R₃ each represent an i-propyl group.

14. A N-substituted acrylamidine compound as defined in claim 11 wherein R₁ and R₃ each represent an i-propyl group and R₂ represents a hydrogen atom.

15. A N-substituted acrylamidine compound as defined in claim 11 wherein R₁ represents an i-propyl group, R₂ represents a methyl group and R₃ represents a phenyl group.

16. A N-substituted acrylamidine compound as defined in claim 11 wherein R₁ represents an i-propyl group, R₂ represents a hydrogen atom and R₃ represents a phenyl group.

* * * * *